(12) United States Patent
Swift et al.

(10) Patent No.: US 11,483,535 B2
(45) Date of Patent: *Oct. 25, 2022

(54) SYNCHRONIZING SECONDARY AUDIOVISUAL CONTENT BASED ON FRAME TRANSITIONS IN STREAMING CONTENT

(71) Applicant: IAMCHILLPILL LLC., Sherman Oaks, CA (US)

(72) Inventors: Sidney Swift, Sherman Oaks, CA (US); Mathew Mozaffari, Toronto (CA); Rhys Balevicius, Toronto (CA); Stephanie Loureiro, Toronto (CA); Nicholas K. Swift, Sherman Oaks, CA (US)

(73) Assignee: IAMCHILLPILL LLC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,890

(22) Filed: Jul. 29, 2021

(65) Prior Publication Data
US 2022/0224873 A1 Jul. 14, 2022

Related U.S. Application Data

(63) Continuation of application No. 17/147,178, filed on Jan. 12, 2021, now Pat. No. 11,082,679.

(51) Int. Cl.
*H04N 13/167* (2018.01)
*H04N 13/398* (2018.01)
(Continued)

(52) U.S. Cl.
CPC ......... *H04N 13/167* (2018.05); *G06T 19/006* (2013.01); *H04N 13/398* (2018.05); *G06K 9/6201* (2013.01); *G06T 7/0016* (2013.01)

(58) Field of Classification Search
None
See application file for complete search history.

(56) References Cited

U.S. PATENT DOCUMENTS 9,323,785 B2 4/2016 Laxminarayana Bhat et al.
9,460,346 B2 10/2016 King et al.
(Continued)

FOREIGN PATENT DOCUMENTS

CN 1578414 A 2/2005
CN 1865843 A 11/2006
(Continued)

OTHER PUBLICATIONS

Eyecandylab, "eyecandylab wins patent to build on its IP portfolio for video AR technology platform," 3 pages, accessed Oct. 28, 2021, appears dated Nov. 30, 2020, available at https://eyecandylab.com/eyecandylab-wins-patent-to-build-on-its-ip-portfolio-for-video-ar-technology-platform/.

(Continued)

*Primary Examiner* — Patrick F Valdez
(74) *Attorney, Agent, or Firm* — Banner & Witcoff, Ltd.

(57) ABSTRACT

According some aspects, a secondary device may display secondary audiovisual content along with playback of audiovisual content on a primary device. For example, the secondary device may display an augmented reality application synchronized with the video. Aspects may predetermine a set of frame transition ranges for the video, where each respective frame transition is determined based on frames of the video that are determined to be substantially identical by a frame reference function and frames that are determined to be different. Two frames may be substantially identical even if they are different in the source video. This may be due to shortcomings in the frame reference function, or encoding/compression losses in transmission and playback of the video. Playback may be synchronized based on a first (Continued)

detected frame, but synchronization may be refined upon detecting a frame transition to a second frame that is no longer substantially identical to prior frames.

20 Claims, 6 Drawing Sheets

(51) Int. Cl.
*G06T 19/00* (2011.01)
*G06T 7/00* (2017.01)
*G06K 9/62* (2022.01)

(56) References Cited

U.S. PATENT DOCUMENTS

| | | | |
|---|---|---|---|
| 9,706,102 B1 | 7/2017 | McInerny | |
| 10,033,941 B2 | 7/2018 | Williams et al. | |
| 10,198,842 B2 | 2/2019 | Korzunov | |
| 10,721,431 B2 | 7/2020 | Ahmann et al. | |
| 2008/0219641 A1* | 9/2008 | Sandrew | G11B 27/105 386/E5.003 |
| 2008/0316307 A1* | 12/2008 | Petersohn | H04N 5/147 348/E7.02 |
| 2009/0102859 A1 | 4/2009 | Athsani et al. | |
| 2009/0180697 A1 | 7/2009 | Erol et al. | |
| 2009/0237546 A1 | 9/2009 | Bloebaum et al. | |
| 2011/0214082 A1 | 9/2011 | Osterhout et al. | |
| 2012/0113142 A1 | 5/2012 | Adhikari et al. | |
| 2012/0167135 A1 | 6/2012 | Yu et al. | |
| 2012/0185905 A1 | 7/2012 | Kelley | |
| 2013/0124508 A1 | 5/2013 | Paris et al. | |
| 2014/0059604 A1 | 2/2014 | Kim et al. | |
| 2014/0059630 A1 | 2/2014 | Kim et al. | |
| 2014/0232748 A1 | 8/2014 | Kis et al. | |
| 2014/0254934 A1 | 9/2014 | Laxminarayana Bhat et al. | |
| 2014/0317659 A1 | 10/2014 | Yasutake | |
| 2015/0185017 A1 | 7/2015 | Kreider et al. | |
| 2015/0195626 A1 | 7/2015 | Lee et al. | |
| 2016/0182971 A1 | 6/2016 | Ortiz et al. | |
| 2016/0307371 A1* | 10/2016 | Ayers | H04N 21/816 |
| 2017/0287187 A1 | 10/2017 | Korzunov | |
| 2017/0318347 A1 | 11/2017 | Abecassis et al. | |
| 2018/0205926 A1 | 7/2018 | Mogalapalli et al. | |
| 2021/0390937 A1* | 12/2021 | Elgammal | G10H 1/0008 |

FOREIGN PATENT DOCUMENTS

| | | |
|---|---|---|
| CN | 102214000 B | 4/2013 |
| CN | 103428442 A | 12/2013 |
| EP | 2015227 A2 | 1/2009 |
| EP | 2808805 A1 | 12/2014 |
| EP | 3410353 A1 | 12/2018 |
| JP | 2011118724 A | 6/2011 |
| WO | 2015108243 A1 | 7/2015 |
| WO | 2016012044 A1 | 1/2016 |

OTHER PUBLICATIONS

Eyecandylab, "The Power of Video-Triggered AR," Sep. 5, 2019, pp. 1-21.
Spotify, "Incorporating Virtual and Augmented Reality into Your Release Strategy," retrieved from https://artists.spotify.com/blog/incorporating-virtual-and-augmented-reality-into-your-release-strategy, Nov. 26, 2018.
Billboard, "What's the Future of the Music Video? Youtube, Spotify & More Share Visions for What's Ahead," retrieved from https://www.billboard.com/articles/business/8467188/future-music-video-youtube-spotify-snapchat, Jul. 26, 2018.
AugmenTV, "AR Lens for video." retrieved from https://augmen.tv/, Dec. 22, 2020.
Soundpays, "Home," retrieved from https://soundpays.com/wp/, Nov. 15, 2020.
Kawakita et al., 'Augmented TV: An Augmented Reality System for TV Programs Beyond the TV Screen', ICMCS, Apr. 2014.
Apr. 18, 2022—ISR &WO—PCT/US2022/011905.

* cited by examiner

SYNCHRONIZING SECONDARY AUDIOVISUAL CONTENT BASED ON FRAME TRANSITIONS IN STREAMING CONTENT

CROSS REFERENCE TO RELATED APPLICATIONS

This application is a continuation of prior U.S. application Ser. No. 17/147,178 filed on Jan. 12, 2021, the entirety of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to synchronizing secondary content playback with primary content playback. More specifically, aspects of the disclosure provide methods and techniques for synchronizing playback of an augmented reality application, on a secondary device, corresponding to video playback on another device based on detecting frame transitions in the video playback.

BACKGROUND

Augmented reality (AR) technologies allow computing devices to display audiovisual experiences, sometimes interactive, overlaid on captured video of the real world around a user. AR applications have been used in many industries to present users with additional information and enhanced experiences, promoting products or digitizing experiences. AR applications can serve as "second screen" experiences for television content, for example where additional information about a television show is displayed on a second device in synchronization with the television show.

AR applications that synchronize with other displayed content must determine a playback location of the displayed content so that corresponding AR content can be displayed. Several techniques exist for synchronizations, such as embedded codes added to a video for the AR application to detect and determine a playback location. However, these embedded codes often change the nature of the content and can be intrusive to the user experience. Software toolkits, such as Apple's ARKit for iOS are available to provide functions supporting AR experience on common user devices.

Music videos are a popular form of entertainment, allowing users to experience a combined audiovisual work tying a song to often interesting video. Originally consumed by users on television channels such as MTV, today music videos are streamed online at popular websites such as YouTube and Vevo. And streaming radio sites such as Spotify have largely replaced personal MP3 collections, CD collections, or FM radio as users' preferred way to listen to music.

The nature of the content of the video may lead to some consecutive frames of the video being identical as to content. For example, a title screen may have static content and appear for several seconds. Beyond actually identical frames, minor differences frame-to-frame, even if part of a bigger movement, might be imperceptible to users on a frame-by-frame basis. These same imperceptible differences could be programmatically identified by a pixel-by-pixel comparison. But analyzing every pixel of a frame is computationally taxing and often infeasible in application. Thus applications may perform image recognition on part or less than all of the image, such as through a sampling technique or aggregation. These frame-to-frame issues may be further exacerbated by streaming video/radio platforms. Streaming video/radio services must balance audiovisual quality/fidelity with Internet bandwidth/speed limitations and goals. As a result, a music video recorded at a very high resolution with nuanced details might be streamed at a lower resolution or have other details removed by video compression techniques. Similarly, high quality audio may be streamed at a lower bitrate to balance bandwidth considerations. Many of the resulting changes in the content are unnoticeable by most users, or may otherwise not disrupt the viewing/listening experience. But these limitations may further complicate the ability of image recognition techniques to discern distinctions from frame-to-frame.

Aspects herein may provide an AR application displayed in synchronization with a music video or radio stream. One problem presented by the AR platforms described above is that they must embed tags or other codes into content to allow the AR application to synchronize. This may require additional processing of the content by a content producer, and may negatively impact the user experience. Even if encoded within the content in a manner inobtrusive to the user, these systems still require modification of the source content and cannot be flexibly applied to existing content already on a streaming platform without modifying the content. Aspects described herein may leverage the shortcomings of Internet streaming platforms to address these and other problems, and generally improve the quality, efficiency, and adaptability of AR applications presenting secondary content in synchronization with audiovisual content from a streaming service.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may relate to methods and techniques for displaying secondary audiovisual content in synchronization with other media content. For example, aspects described herein may provide a system for displaying an augmented reality application, on a secondary device, in synchronization with playback of a music video on a primary device. In a streaming video, multiple consecutive frames may be so similar that a frame reference function (also referred to as a frame reference identification function) provided by an AR toolkit determines them to be substantially identical, even if the content of the frames does differ. The frame reference function may be a behind-the-scenes part of the AR toolkit, but serves to determine the identity of a capture frame. Synchronization cues may be taken from determining frame transitions, accounting for the imperfect nature of streaming content and its impact on content matching functions, according to some aspects. Frame transitions that are recognizable by the AR toolkit may be predetermined for a video, generating a set of frame transition ranges. Then, the secondary device may synchronize playback based on a first detected frame, but synchronization may be refined upon detecting a frame transition to a second frame that is no longer substantially identical to prior frames.

Thus, some aspects may provide a computer-implemented method to synchronize playback between secondary audiovisual content and a video. The method may comprise determining a set of frame transition ranges for a video. Each respective frame transition range may comprise a starting frame identifier and an ending frame identifier associated with a series of frames of the video that are each determined to be substantially identical by a predefined frame reference function. The frame reference function may be an image matching function provided as part of an AR toolkit, such as functionality using the ARReferenceImage element in the ARKit for iOS provided by Apple. For example, a frame reference function may be configured to retrieve a current frame and compare it to an ARReferenceImage to determine if the frame matches a reference image. The frame reference function may, in some implementations, be part of the AR toolkit's environment and might not be expressly called by the application developer. Instead, the frame reference function may be functionality built into other components of the AR toolkit, such as component that recognized when a known reference frame is present in captured video content. The video played back on the primary device may be a compressed video file streamed over the Internet via a network connection. The video file may be in a lower bitrate encoding, or include compression artifacts causing nuanced differences in contiguous frames of a source video to be lost in the streaming video file, for example. Similar-but-not-identical frames may nonetheless be deemed substantially identical by the predefined frame reference function due to how the reference function is configured. The predefined frame reference function may determine the contiguous series of frames to be substantially identical based on the streaming file's omission of these nuanced differences due to, e.g., compression artifacts or quality of the streaming file. For example, the reference function may determine two frames to be substantially identical if they match within a certain threshold percentage.

According to some aspects, each frame in the frame transition range may be determined to be substantially identical to each other frame in the frame transition range based on the predefined frame reference function determining that the frames are identical. The set of frame transition ranges may be predetermined based on processing frames of the video to determine series of contiguous frames that are deemed substantially identical by the predefined frame reference function. In a given frame transition range, the starting frame identifier may correspond to the first frame of the series of contiguous frames that differs from the frames of a prior transition range based on the predetermined frame reference function, and the ending frame identifier may correspond to the last frame of the series of contiguous frames prior to a different frame of a next transition range based on the predetermined frame reference function.

The method may comprise capturing, by a secondary device and at a first time, a currently displayed first frame of the video during playback of the video by a primary device. The secondary device may determine, based on the predefined frame reference function, a first frame transition range corresponding to the captured first frame of the video. The secondary device may synchronize secondary audiovisual content (such as an augmented reality application) with the playback of the video based on the first frame transition range corresponding to the captured first frame of the video.

Synchronizing the secondary audiovisual content may, for example, comprise causing events in the AR application to be displayed on the secondary device when a corresponding event is displayed on the primary device. For example, the secondary device may cause events in an AR application to be displayed in coordination with the current playback position of the video.

The method may further comprise capturing, by the secondary device and at a second time after the first time, a currently displayed second frame of the video during the playback of the video by the primary device. The secondary device may determine whether the captured second frame corresponds to a current frame transition range corresponding to a current playback position of the secondary audiovisual content based on the predefined frame reference function. And the secondary device may synchronize, based on determining that the captured second frame does not correspond to the current frame transition range, the secondary audiovisual content with the playback of the video based on a second frame transition range identified as corresponding to the captured second frame based on the predefined frame reference function. For example, the AR application may be synchronized to a starting frame of the second frame transition range upon recognizing the captured second frame and corresponding frame transition.

According to some aspects, the method may further comprise capturing, by the secondary device and at a third time between the first time and the second time, a currently displayed third frame of the video during the playback of the video by the primary device. The secondary device may determine whether the captured third frame corresponds to the current frame transition range based on the predefined frame reference function. And, based on determining that the captured third frame does correspond to the current frame transition range, the secondary device may continue playback of the secondary audiovisual content synchronized based on the first frame transition range corresponding to the captured first frame of the video.

According to some aspects, the method may further comprise capturing, by the secondary device and at a third time, a currently displayed third frame of the video during the playback of the video by the primary device. The secondary device may determine that the captured third frame corresponds to the first frame transition range based on the predefined frame reference function. The secondary device may determine that a time period between the first time and the third time exceeds a duration of the first frame transition range. Based on determining that the time period exceeds the duration of the first frame transition range, the secondary device may pause playback of the secondary audiovisual content. While playback of the secondary audiovisual content is paused, the secondary device may capture a currently displayed fourth frame of the video during the playback of the video by the primary device. The secondary device may determine that the captured fourth frame corresponds to a different frame transition range, other than the first frame transition range, based on the predefined frame reference function. And based on determining that the captured fourth frame corresponds to the different frame transition range, the secondary device may resume playback of the secondary audiovisual content based on the different frame transition range.

In some implementations, synchronizing the secondary audiovisual content with the playback of the video based on the first transition range may comprise synchronizing the secondary audiovisual content with the playback of the video based on the starting frame identifier of the first frame transition range. In some implementations, synchronizing the secondary audiovisual content with the playback of the video based on the first transition range may comprise selecting a frame identifier between the starting frame identifier of the first frame transition range and the ending frame identifier of the first frame transition range based on selection criteria and synchronizing the secondary audiovisual content with the playback of the video based on the selected frame identifier.

In some implementations, synchronizing the secondary audiovisual content may be based on audio output by the primary device and associated with the playback of the video. For example, due to similar limitations in Internet streaming of audio content, the video frame transition synchronization techniques described above may be adapted to match reference audio portions captured by the secondary device. This audio synchronization method may be utilized to, e.g., display an AR application in synchrony with streamed music. This audio synchronization may also be used in conjunction with the video synchronization to determine a more accurate result.

Aspects may provide a computer-implemented method to synchronize display of secondary audiovisual content with playback of a video based on detecting frame transitions. The method may comprise determining a set of frame transitions for a video. Each frame transition may correspond to a respective starting frame that is determined to be different from a prior frame based on the predefined frame reference function. The method may further comprise capturing, by a secondary device and at a first time, a currently displayed first frame of the video during playback of the video by a primary device. The secondary device may determine a first playback position of the video based on a first frame transition, of the set of frame transitions, corresponding to the captured first frame of the video. The secondary device may synchronize secondary audiovisual content with the playback of the video based on the first frame transition corresponding to the captured first frame of the video. The method may further comprise capturing, by the secondary device and at a second time, a currently displayed second frame of the video during the playback of the video by the primary device. The secondary device may determine a second frame transition, of the set of frame transitions, corresponding to the captured second frame when the predefined frame reference function indicates that the captured second frame is different from the captured first frame. The secondary device may synchronize, based on determining the second frame transition, the secondary audiovisual content with the playback of the video based on the starting frame of the second frame transition identified as corresponding to the captured second frame.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for displaying secondary audiovisual content in synchronization with other media content. For example, aspects described herein may provide a system for displaying an augmented reality application, on a secondary device, in synchronization with playback of a music video on a primary device. In a streaming video, multiple consecutive frames may be so similar that a frame reference function provided by an AR toolkit (such as functionality using the ARReferenceImage element from the iOS ARKit) determines them to be substantially identical, even if the content of the frames does differ. Synchronization cues may be taken from determining frame transitions, accounting for the imperfect nature of streaming content and its impact on content matching functions, according to some aspects. Frame transitions that are recognizable by the frame reference function may be predetermined for a video, generating a set of frame transition ranges. Then, the secondary device may synchronize display of secondary content with the video based on detecting a frame transition or based on detecting that a currently captured frame of the video does not align with an expected frame transition range for the current playback position of the secondary audiovisual content. Playback may be synchronized based on a first detected frame, but synchronization may be refined upon detecting a frame transition to a second frame that is no longer substantially identical to prior frames.

Before discussing these concepts in greater detail, however, several examples of a computing device that may be used in implementing and/or otherwise providing various aspects of the disclosure will first be discussed with respect to FIG. 1.

Figure 1:
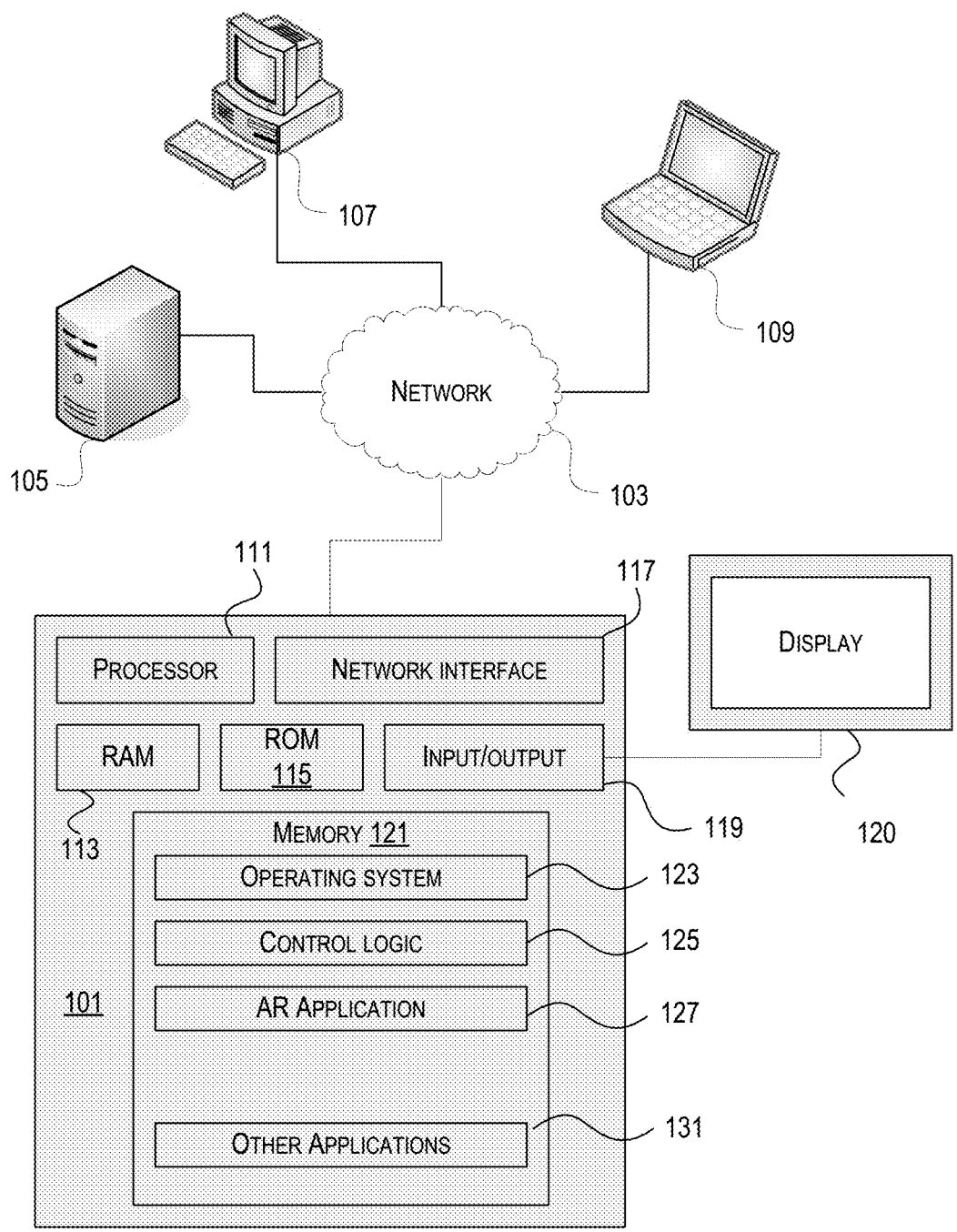
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, augmented reality (AR) application 127, and other applications 131. Control logic 125 may be incorporated in and may be a part of AR application 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for synchronizing secondary audiovisual content (such as an AR application), by a secondary device, with playback of a video (such as a music video) on a primary device.

Aspects may be implemented, for example, in an application on a secondary device which uses the visual recognition of frames of a music video played by a primary device to collect data on the start of a music video and present a visual, augmented reality and/or digital experience (e.g., secondary audiovisual content corresponding to the music video) through the application. The augmented reality may create an interactive experience to augment the music video, which may be heightened through competition and even may allow users to win various prizes (such as cash, merchandise) based on their ranking within the application. In an example implementation, competitions may begin at a certain time to create a sense of excitement around the launch of a new music video. Users may thus anticipate each upcoming music video due to a sense of urgency or fear of missing out, and this may create new opportunities within the augmented reality world. Augmented reality experiences can extend the music video content by introducing new visual, interactive experiences beyond the music video content. They may introduce different characters, or provide an interactive game on top of the music video. Different games can be provided with different scoring or interactions, and can create excitement and better engage users. These aspects may thus provide a platform to express pop culture in a strong digital form, by integrating exclusive events, news and an environment where individuals can compete and experience new music and cultural moments. Using augmented reality, aspects described herein may open up a new opportunity for digital concerts and digital experiences which are not always possible due to the physical nature of artists. And with the rise of all digital artists, where an avatar or other online presence serves as the artist's persona, an augmented reality platform according to some aspects may improve content producers' ability to promote, develop, and expand their audience and engagement.

In an example, consider an artist that releases a song on Spotify. The hook of the song could have an audio trigger that opens an additional content platform on the user's mobile phone. The additional content could, for example, be a game or an alternate version of the song, or exclusive merchandise. Similarly, the artist releases a music video on YouTube. Frames of the video could trigger the additional content platform to open additional content—like a video game—which synchronizes throughout the music video and triggers different aspects of the game. For example, a use case could be a user has a music video playing on a laptop or desktop computer. The user could scan a QR code in the music video to access an AR application on the user's mobile phone. In these ways and others, the AR application is able to identify which song/video the user is viewing, and can select the appropriate AR experience.

As discussed above, however, existing second screen experiences for television require obtrusive tags and/or codes to be embedded in the video in advance to enable the AR application and substantially synchronize it with the video. This can be troublesome for content producers, as it requires them to modify existing video content and potentially reupload to streaming platforms, losing views and reputation (such as "likes" and shares). Aspects described herein thus may recognize reference frames in the video without requiring the embedding of coded tags in the video. This may allow for creation of AR experiences for video content after the video content has been released, and could allow for creation by third parties. But, as also discussed above, recognizing reference frames can be imperfect due to the configuration of the frame reference identification function chosen, or due to imperfections introduced by the realities of a streaming platform. For example, a streaming platform may downsample a bitrate or resolution of audio-visual content, which could result in nuanced differences among frames being removed. Or, the contrary could happen where the act of downsampling introduces differences that are not in the source material.

Frame reference functions, such as functionality utilizing Apple's ARReferenceImage element from the ARKit for iOS, are configured to account for some variation among images that it otherwise determines are identical. The frame reference function may, in some implementations, be part of the AR toolkit's environment and might not be expressly called by the application developer. Instead, the frame reference function may be functionality built into other components of the AR toolkit, such as component that recognized when a known reference frame is present in captured video content. For example, in some implementations, the frame reference function may refer to the functionality at work behind the scene in Apple's ARKit when an AR session flags a frame identified event. A set of ARReferenceImages may be used to configure the AR session, and the session may raise an event each time a reference image is identified in the data captured by the camera. As used herein, the frame reference function in this example is the functionality that identifies whether a portion of the capture image corresponds to a reference image. A frame reference function may be configured to retrieve a current frame and compare it to a set of ARReferenceImages to determine if the frame matches a reference image.

An illustrative implementation of some aspects is provided below, in which the frame reference function is provided by background frame matching functionality in Apple's ARKit. The below code is provided in Apple's Swift language. The function "renderer" is called as a delegate when the AR session recognizes a frame within the image captured by the camera, based on a set of ARReferenceImages used to configured the AR session. So once the frame reference functionality in ARKit's AR session recognizes a known reference frame, the delegate function "renderer" is called and acts on the recognized frame. The detected frame may, according to some aspects, be associated with a known time range within the video.

```swift
func renderer(_renderer: SCNSceneRenderer, nodeFor
    anchor: ARAnchor) →SCNNode?
{
    // This delegate method can be used for other purposes,
        so we silently fail if the
    // anchor object being added to the scene cannot be
        appropriately casted to an
    // ARImageAnchor object, i.e. an image detected by the
        AR framework
    if let imageAnchor=anchor as? ARImageAnchor
        // If code is executing inside of this block then an
            image has been detected.
        if let name=imageAnchor.referenceImage.name
            // Let's look at the name of the detected image
                (e.g. if the image detected was
            // "my_image.png" the variable 'name' would be
                initialized to "my_image")
            // here. This additional conditional block is really
                just a sanity check—but
            // could also be useful if you want to detect images
                (and do stuff with them)
            // that aren't frames.
            // At this point we know not only if a frame has
                been detected, and also have a
            // reference to that specific frame. So we could
                look up some additional data
            // associated to that frame (such as a range of
                timestamps that it might be
            // detected between) and proceed from there.
            let  timestamp_range=getFrameMetadata(name:
                name)
            // . . . and so on
        }
    }
}
```

As will be discussed further herein, some aspects may provide for novel techniques of refining the identified time stamp within the video based on detecting a frame transition. For example, an application can check the detected "name" of the recognized frame to determine if a frame transition has occurred.

Embedded codes can be effective means of synchronization because their position is deliberate and known when added. But when a system relies on reference frame matching instead, a sequence of frames that the frame reference function (e.g., frame reference functionality in ARKit based on ARReferenceImages) recognizes as substantially identical can lead to imprecise synchronization. Thus, some aspects described herein may predetermine frame transition ranges of substantially identical frames of a video, and dynamically synchronize secondary audiovisual content with playback of a video based on the frame transition ranges. A secondary device may determine which video is being played, and retrieve the predetermined frame transition ranges. Though the secondary device may be unable to determine a precise playback location when detecting a first frame that is part of a series of substantially identical frames, the secondary device may refine the synchronization of the secondary audiovisual content once a frame transition is detected to a frame that is not substantially identical to a current frame transition range, knowing that the video playback is on a different frame than originally determined by the secondary device.

Figure 2:
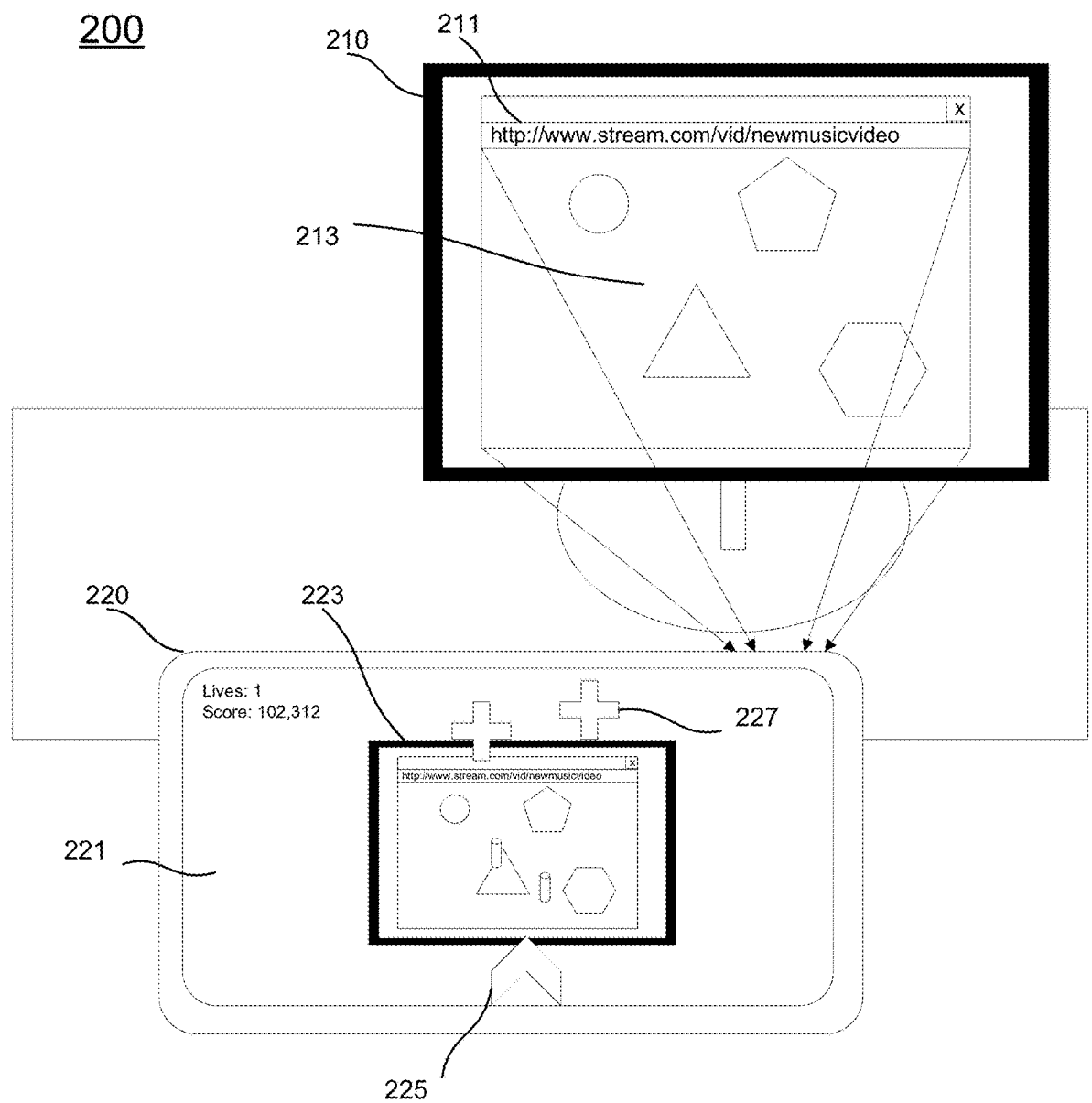
FIG. 2 depicts an example computing environment, including a primary device displaying video content and a secondary device displaying secondary audiovisual content, in accordance with one or more aspects of the disclosure.

FIG. 2 illustrates an example system 200 where a user is viewing a streaming music video 213 via a web browser 211 on a primary device 210 (such as a laptop or desktop computer). The user's mobile device 220 is displaying an AR application view 221 overlaid on video playback 223 captured by a camera of the mobile device 220. The AR application illustrated has the player controlling a vehicle 225 and presents obstacles 227.

Figure 3A:
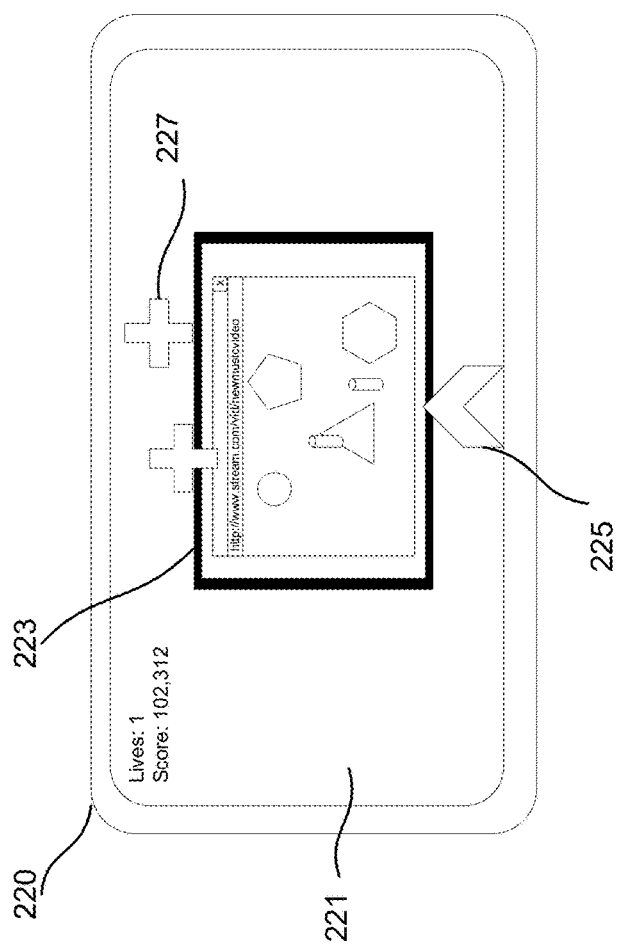
FIGS. 3A-3B depict a synchronization between the secondary audiovisual content and the playback position of the video, in accordance with one or more illustrative aspects discussed herein.
Figure 3B:
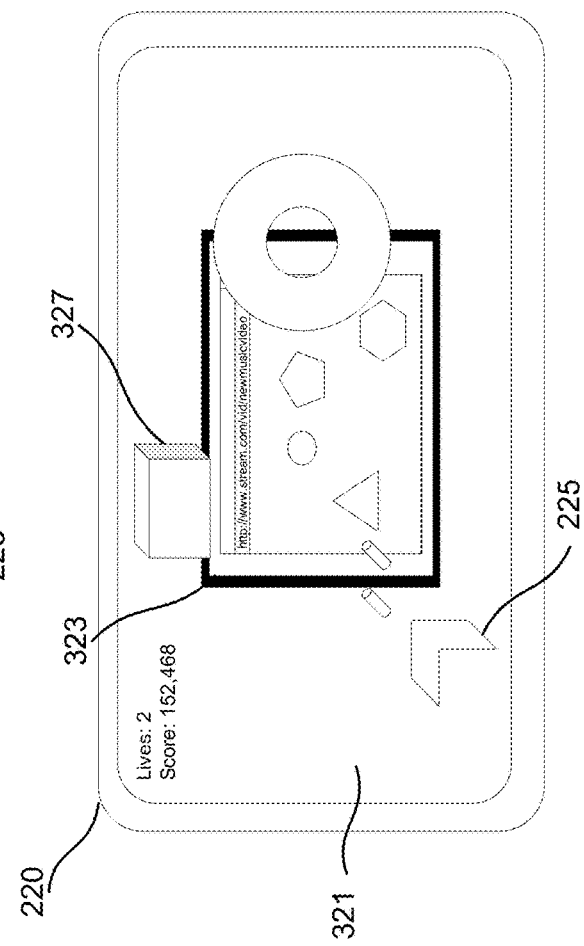

FIGS. 3A and 3B further illustrate the AR application view 221 and how it may be synchronized with playback of the video. As the video playback position advances (and the content of the video changes), the AR application can be synchronized such that events in the AR application occur in sync with corresponding events in the video. For example, FIG. 3A illustrates the initial game state 221 from FIG. 2 corresponding to the video at frame 223. But in FIG. 3B, the video has advanced to a later frame 323 where the content has changed from frame 223. Properly synchronized, the AR application 321 may be intended to display a new obstacle 327 corresponding to the content of frame 323. But if the game is out of synchronization with the video playback position, the proper obstacles may not be displayed corresponding to the current state of the video which may be a negative experience for the user.

Synchronization can also be important to provide users with the ability to pause, restart, rewind, fast forward, or otherwise control video playback. Such controls can cause the secondary audiovisual content to get out of sync with the video playback, so effective means of re-synchronizing and dynamically improving the synchronization can support these features. For example, the AR application could pause when the secondary device detects that the video has paused, such as when a substantially identical frame has been detected for longer than the expected duration of a frame transition range associated with that frame.

Time synchronization is a significant technical problem in AR applications, and aspects described herein may contribute to improved time synchronization and address shortcomings of the streaming platforms and AR toolkits. Aspects described herein may model the time elapsed within the video and fire events based off of specific timestamps in an improved fashion. While in practice it may not be possible to perfectly synchronize the application with media being played on any device (for example, without using some software bridge between the two devices to keep them in sync), aspects described herein may minimize the potential threshold wherein any desynchronization between the two mediums can occur. Implementations may reduce the distance between the AR application's internal "event time" and the actual media's playback time to less than 250 ms (e.g. within +/−6 frames of a 24 fps video). Because the average human reaction time falls within this range, this may provide a seamless experience for the user. Aspects described further herein may improve the AR application on the secondary device to hold an internal representation of the current elapsed time of the media being played back. Then by detecting key "reference points"—frame transitions—of the media, the secondary device may compute an approximation of the elapsed time throughout the media's duration and otherwise synchronize in-app events with specific timestamps.

Figure 4:
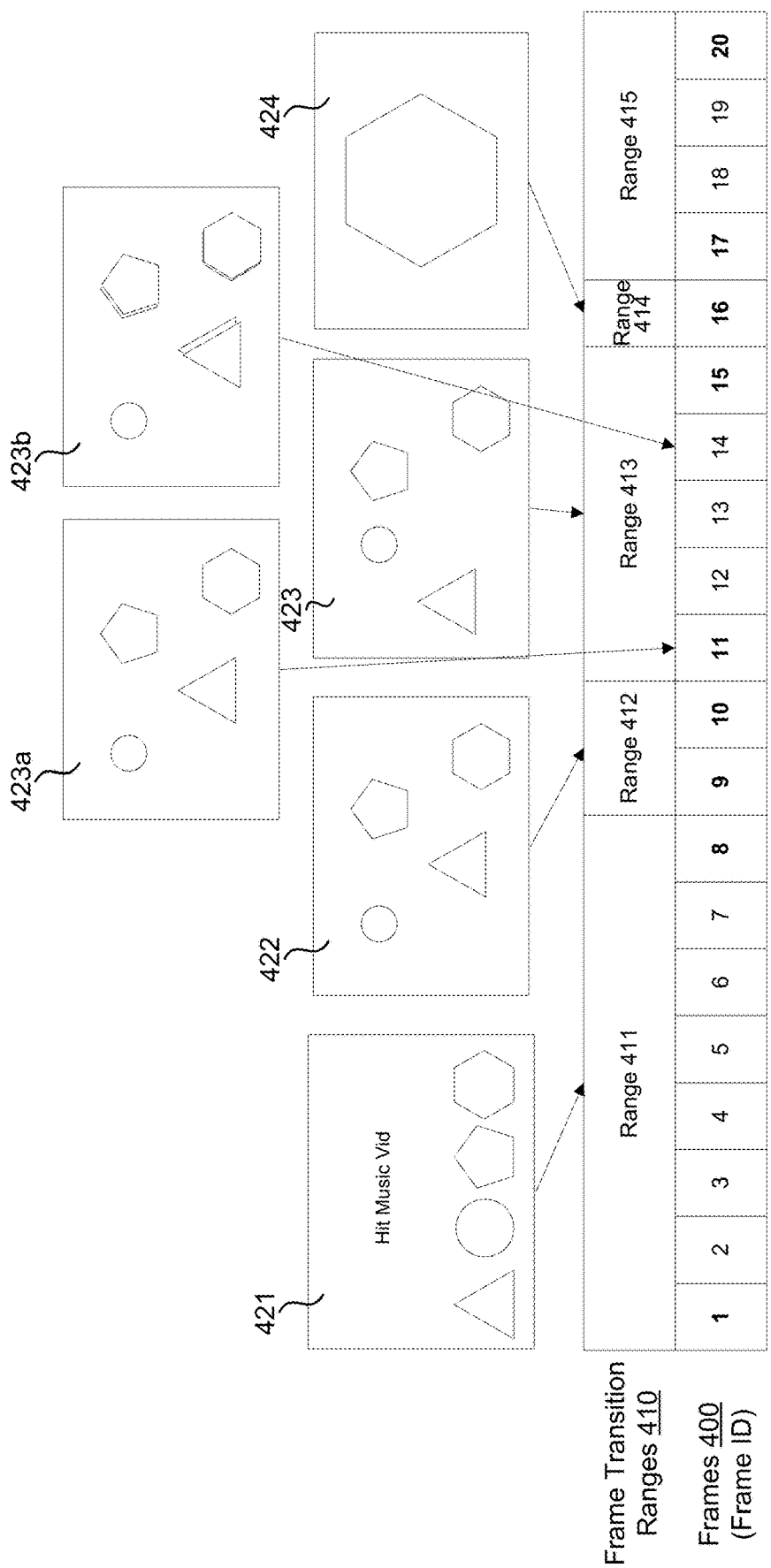
FIG. 4 depicts an illustrative sequence of frames that make up an exemplary video, and frame transition ranges associated therewith, in accordance with one or more illustrative aspects discussed herein.

FIG. 4 illustrates content of a set of frames 400 and frame transition ranges 410 associated with an exemplary piece of media content. As illustrated, the media content (of the example) may comprise 20 frames. Frames 1-8 (e.g., with numbers referring to a frame ID within the logical context of the video) may be, for example, a relatively static title screen for the media content as displayed in frame content 421. Frames 9-10 may be an initial scene 422, whereas frames 11-15 comprise an action scene 423 with frame-to-frame movements shown in frames 423a and 423b. Frame 16 may be a closeup frame having content 424, and frames 17-20 may continue the media content.

Frame transition ranges for a video may be used to better synchronize secondary audiovisual content, such as an AR application. The frame transition ranges for the video may be predetermined using a frame reference function, such as an image matching function provided as part of an AR toolkit (e.g., functionality utilizing the ARReferenceImage element in the ARKit for iOS provided by Apple). Each respective frame transition range may comprise a starting frame identifier and an ending frame identifier associated with a series of frames of the video that are each determined to be substantially identical by a predefined frame reference function. Similar-but-not-identical frames may nonetheless be deemed substantially identical by the predefined frame reference function due to how the reference function is configured and due to the nature of streaming video. For example, the predefined frame reference function may determine the contiguous series of frames to be substantially identical based on the streaming file's omission of these nuanced differences due to, e.g., compression artifacts or quality of the streaming file.

According to some aspects, each frame in the frame transition range may be determined to be substantially identical to each other frame in the frame transition range based on the predefined frame reference function determining that the frames are identical. The set of frame transition ranges may be predetermined based on processing frames of the video to determine series of contiguous frames that are deemed substantially identical by the predefined frame reference function. As used herein, two frames are deemed "substantially identical" when the predefined frame reference function does not discern a substantial difference between the two frames. Aspects herein may utilize a predefined, third party frame reference identification function. Aspects herein may be used with any suitable frame reference identification function, and the particulars of how the predefined function determines if two frames are substantially identical are a matter of implementation. As discussed further herein, the AR application may rely on a result returned by the frame reference function as a determination of whether two frames are substantially identical or not.

Similar-but-not-identical frames may nonetheless be deemed substantially identical by the predefined frame reference function due to how the reference function is configured. For example, the frame reference function may be configured to consider a portion of the frames but less than all pixels of the frames. Or the frame reference function may sample regions within the frames, perhaps aggregating various pixel blocks to efficiently compute whether the two frames are the same. Similarly, to be robust to various conditions in the image capture (e.g., skew, lighting, obstructions), the frame reference function may be configured to adapt to these conditions such that it may properly determine that two frames that are identical even if lighting or other conditions introduce external changes. As a simple example, the frame reference function may be determined to treat two frames as identical if a similarity between the frames is more than a particular threshold, for example 95% the same. In practice, image recognition functions such as a frame reference identification function are much more complex in how they discern whether two frames are substantially identical or not. And in the example of Apple's ARKit, the frame reference function may be implemented in the background functionality underlying an AR session, utilizing ARReferenceImages to determine when a reference frame is identified for processing by the application delegate functions.

In a given frame transition range, the starting frame identifier may correspond to the first frame of the series of contiguous frames that differs from the frames of a prior transition range based on the predetermined frame reference function, and the ending frame identifier may correspond to the last frame of the series of contiguous frames prior to a different frame of a next transition range based on the predetermined frame reference function.

In the illustrated example, frames 1-8 may be deemed identical and/or substantially identical (e.g., matching within a certain threshold percentage, such as 99% the same) because each has same content 421. Thus, frames 1-8 may be determined to belong to a same frame transition range 411. Similarly, Frames 9 and 10 may have the same content 422, and may be determined to belong to frame transition range 412.

Frames 11-15, in the example, correspond to an action scene with movements. Generally frames 11-15 have substantially identical content, but subtle variations associated with the movement may exist in content 423a and 423b. Nonetheless, the frame reference function may determine frames 11-15 to be substantially identical. This may be because the frame reference function is configured to consider only portions of the frames, or if the frame comparison techniques overlook certain nuanced, bit by bit differences. As mentioned previously, the frame reference function may deem frames to be substantially identical if they match within certain threshold values. And it may be because downsampling or other techniques used to manage streaming video have impacted discernible differences among frames. Because frames 11-15 are determined to be substantially identical, frames 11-15 are determined to belong to frame transition range 413.

Completing the example, frame 16 may be part of frame transition range 414 and have distinct content 424 of a closeup on a character. And frames 17-20 may be part of frame transition range 415 due to similarity/identical content.

Figure 5:
FIG. 5 depicts an example of two frames that a frame reference function may determine to be substantially identical even if not identical.

FIG. 5 depicts another example of two frames 551 and 552 in video content that may be determined to be substantially identical, despite having actually different content. As discussed above, a key difficulty which arises naturally when utilizing a detected frame for determining the elapsed time of the video is the fact that similar frames cannot be reasonably distinguished from one another due to limitations of the frame reference function and/or streaming video applications. More specifically, consecutive frames are typically highly similar. Frame 551 is effectively identical to frame 552 despite being part of an active video with motion.

Frames at the beginning of the video may receive additional processing as recognizing these frames during video playback may be needed to identify the video and start the corresponding augmented reality experience. In determining the frame transition ranges, the system may label distinct frames with their respective timestamps. The distinct frames may be those that provide a discernable distinction recognizable by the frame reference function. The level of "distinctness" for a given implementation may be tuned to the needs of the application. For example, the frame reference function may be configured with a threshold level of distinctiveness for use in determining whether two consecutive frames are substantially identical or not. Where fine-grained synchronization is needed, and processor power is not a limitation, a low threshold of distinctiveness (such as 99% the same) may be used. In processing-limited scenarios, as another example, a higher threshold of distinctiveness may be used (such as 90% the same) to determine "distinct" frames, frame transitions. Frame transition ranges may be determined based on additional factors, such as frame sampling time, recency of changes, amplitude and volatility in changes over a range of time, and the like.

The predetermined frame transitions and frame transition ranges may be used to synchronize display of secondary audiovisual content, by a secondary device, with playback of a video by primary device. A camera of the secondary device may capture the displayed video output from the primary device, and may continually process each individual frame in the video buffer to determine whether or not any of the labelled frame transitions or otherwise distinct frames have been detected. If a particular labelled frame/known frame transition is detected, then the AR application on the secondary device may approximate the elapsed time of the video and synchronize events in the AR application (or other secondary audiovisual content) based on the playback time within the video. The playback time estimation may be based on the known frame transition range. For example, on a detected frame transition from one range to another, the AR application may use a starting frame ID of the current frame transition range to determine a playback position in the video. But where a detected frame is not associated with an immediate frame transition, the AR application may not be able to determine where playback is within the frame transition range. Aspects may provide additional criteria for determining an estimated playback time when the current frame is at an indeterminate position within a current frame transition range. For example, the AR application may default to the start of the frame transition range. Or, it may use the midpoint of the range, for example.

Figure 6:
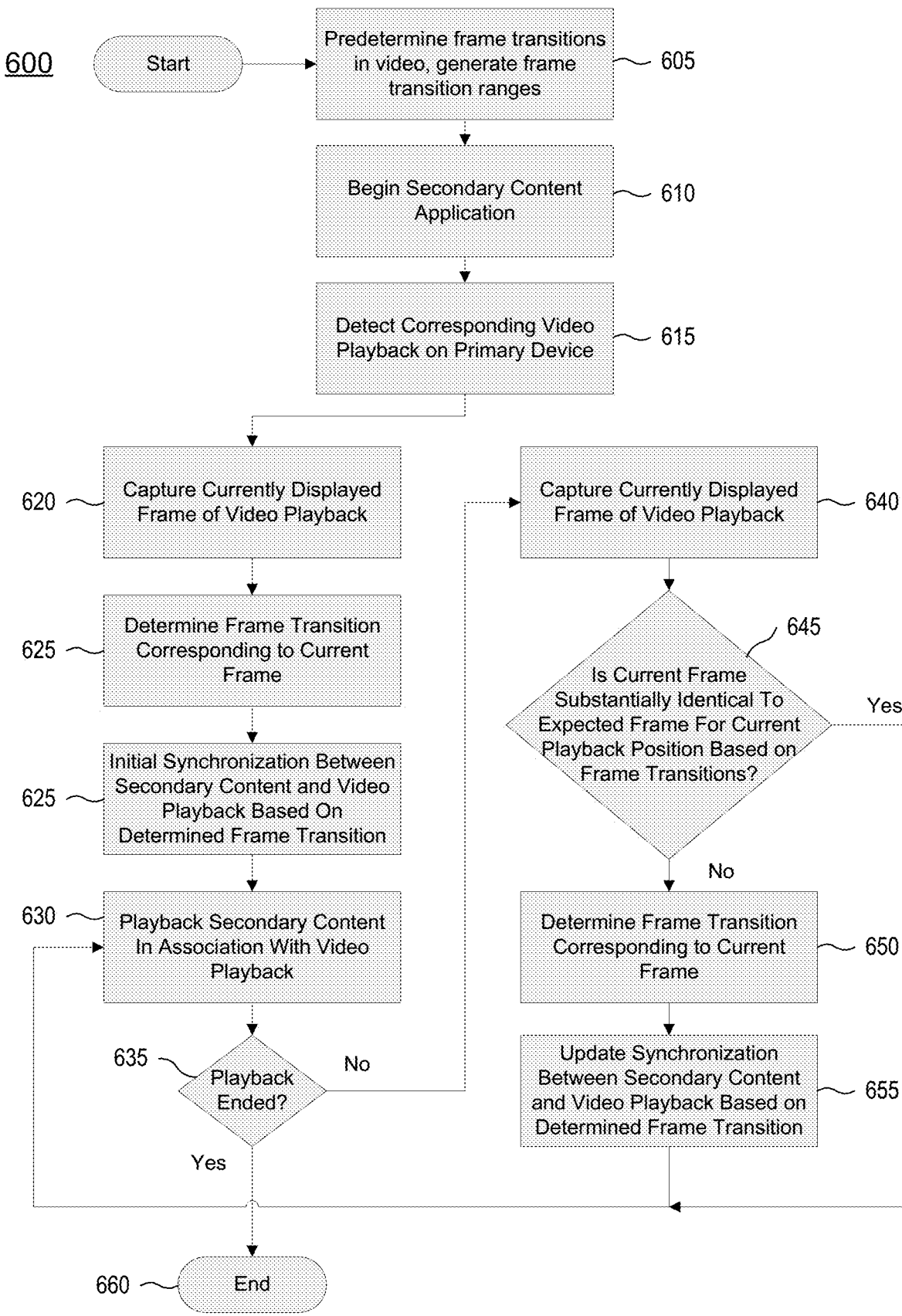
FIG. 6 depicts a flowchart illustrating a method of synchronizing secondary audiovisual content and a playback position of a video, in accordance with one or more illustrative aspects discussed herein.

FIG. 6 illustrates a method 600 for synchronizing secondary content, by a secondary device, with playback of streaming video content on a primary device. For example, method 600 may be used by secondary device 220 of FIG. 2 to synchronize playback of AR application 221 with playback of video 213 by primary device 210.

At step 605, frame transitions and/or frame transition ranges within the video may be predetermined. Each respective frame transition range may comprise a starting frame identifier and an ending frame identifier associated with a series of frames of the video that are each determined to be substantially identical by a predefined frame reference function. The frame reference function may be an image matching functionality provided as part of an AR toolkit, such as functionality utilizing the ARReferenceImage function in the ARKit for iOS provided by Apple. As discussed throughout, similar-but-not-identical frames may nonetheless be deemed substantially identical by the predefined frame reference function due to how the reference function is configured. The predefined frame reference function may determine the contiguous series of frames to be substantially identical based on the streaming file's omission of these nuanced differences due to, e.g., compression artifacts or quality of the streaming file. For example, the reference function may determine two frames to be substantially identical if they match within a certain threshold percentage.

According to some aspects, each frame in the frame transition range may be determined to be substantially identical to each other frame in the frame transition range based on the predefined frame reference function determining that the frames are identical. The set of frame transition ranges may be predetermined based on processing frames of the video to determine series of contiguous frames that are deemed substantially identical by the predefined frame reference function. In a given frame transition range, the starting frame identifier may correspond to the first frame of the series of contiguous frames that differs from the frames of a prior transition range based on the predetermined frame reference function, and the ending frame identifier may correspond to the last frame of the series of contiguous frames prior to a different frame of a next transition range based on the predetermined frame reference function.

Additionally and/or alternatively, the system may predetermine frame transitions or other distinct frames within the video. These frame transitions may be labelled and time stamped relative to the video, and similarly used to synchronize playback of the AR application (or other secondary audiovisual content) with the playback of the video.

At step 610, the secondary device may begin the secondary content application. For example, the user may launch the AR application on their mobile device. As another example, the secondary device may detect a triggering event (such as an embedded cue in the music video) that causes the secondary device to launch the AR application.

At step 615, the secondary device may detect corresponding video playback on the primary device. For example, a camera of the secondary device may capture a field of view, and determine whether the captured field of view includes a frame of the video. The secondary device may process the captured frame to determine an identity of the video being watched, so that a suitable AR experience can be launched. Additionally and/or alternatively, the user may select a desired AR experience to be displayed along with the video playback.

At step 620, the secondary device may capture a currently displayed frame of the video playback as displayed on the primary device.

At step 625, the secondary device may determine an initial synchronization between the AR application (secondary audiovisual content) and the video being played back on the primary device. The initial synchronization may be determined based on the predetermined time stamp labels determined to correspond to the captured first frame. Based on the frame reference function, the secondary device may determine that the captured first frame corresponds to a first frame transition range of the set of frame transition range that were predetermined for the video. The first frame transition range may be associated with a video timestamp, and this time stamp may be used to synchronize events of the AR application with the video. At an initial point of the experience, the AR application may be launched from the beginning of the experience. But a first detected frame may be used by the AR application to determine an initial synchronization between the app. The secondary device may synchronize secondary audiovisual content (such as an augmented reality application) with the playback of the video based on the first frame transition range corresponding to the captured first frame of the video. Synchronizing the secondary audiovisual content may, for example, comprise causing events in the AR application to be displayed on the secondary device when a corresponding event is displayed on the primary device. For example, the secondary device may cause events in an AR application to be displayed in coordination with the current playback position of the video. The AR application may not be able to determine where playback is within the first frame transition range if there have been no other frame transition ranges observed. Aspects may provide additional criteria for determining an estimated playback time when the current frame is at an indeterminate position within a current frame transition range. For example, the AR application may default to the start of the frame transition range. Or, it may use the midpoint of the range, for example.

At step 630 the secondary device may playback the AR application in association with the video playback on the primary device. If playback has not ended at step 635 (*no*), then the secondary device may advance to step 640 to continually and/or periodically capture an updated currently displayed frame that the primary device is currently displaying to further track and/or revise the synchronization between the AR application and the video playback.

At step 645, the secondary device may determine whether the captured second frame corresponds to a current (expected) frame transition range corresponding to a current playback position of the secondary audiovisual content based on the predefined frame reference function. This may comprise using results of the frame reference function to determine if the current frame is substantially identical to an expected for the current (expected) frame transition range associated with the current playback position of the AR application. If the current frame is identical to the frame expected based on the expected position within the video, playback may continue and the method returns to step 630. If the current frame is not substantially identical to the expected frame for the current playback position, the method proceeds to step 650.

At step 650, the secondary device may determine a frame transition corresponding to the captured current frame. This may be based on the frame reference function determining that the captured frame is not substantially identical to a prior frame transition range of the video. The AR application may, in some implementations, assume that the captured frame belongs to a next frame transition range. In other implementations the AR application may determine which frame transition range the captured frame belongs to based on the frame reference function.

At step 655, the secondary device may update synchronization between the AR application and the video playback based on the determined frame transition range corresponding to the captured current frame. For example, the secondary device may determine that the captured frame indicates that video playback is at a playback position that is known to correspond to the determine frame transition range from the predetermining in step 605. This may also include a reasonable buffer tuned to implementation needs, comparing the AR application's internal estimate of the video playback position (internal event clock) to the known timestamp associated with the captured second frame to determine if the AR application and video playback are out of sync. If the difference between the AR playback position and the video playback position are less than a threshold margin, playback may continue. Otherwise, according to some aspects, the secondary device may adjust the timing of the AR application to more closely synchronize with the video playback.

In some implementations, synchronizing the secondary audiovisual content may be based on audio output by the primary device and associated with the playback of the video. For example, due to similar limitations in Internet streaming of audio content, the video frame transition synchronization techniques described above may be adapted to match reference audio portions captured by the secondary device. This audio synchronization method may be utilized to, e.g., display an AR application in synchrony with streamed music. This audio synchronization may also be used in conjunction with the video synchronization to determine a more accurate result.

Several methods are available to include audio synchronization to further refine the synchronization of the AR application and video playback. Some are "invasive" in the sense that they may require manipulation of the audio file which the AR application is intending to synchronize with. In particular, example the "reference points" that could be used are high frequency tones (>20 kHz) and/or stenographically embedded data, each of which would encode the exact timestamps of where they occur in the audio track. But each of these approaches may encounter technical challenges due to common practice of hosting platforms (e.g. YouTube) to re-encode uploaded media. Another method is to to generate a spectrogram of the audio in realtime while simultaneously splitting this image into contiguous "frames". This technique would map directly onto the video synchronization technique outlined above, as the audio frames could be analyzed for distinctness in the same manner and monitored to determine a synchrony between the AR application the video playback.

According to some aspects, the captured current frame may correspond to a frame transition period prior to where the AR application expects playback to be. This may indicate that the AR application is ahead in time and needs to be delayed to allow the video to catch up. But it also may indicate that the video is paused, and the AR application should pause as well. Thus, aspects may further comprise the secondary device determining that a time period between the first time a frame of this frame transition range was captured and the current time that the latest frame of the frame transition range was captured exceeds the total duration of the frame transition range. This may indicate that the video has been paused, as the video should not remain on the same frame for longer than the predetermined frame transition ranges. Based on determining that the time period exceeds the duration of the frame transition range, the secondary device may pause playback of the secondary audiovisual content. While playback of the secondary audiovisual content is paused, the secondary device may continue to capture currently displayed frames of the video during the playback of the video by the primary device (which may be paused). The secondary device may determine that a captured frame corresponds to a different frame transition range, other than the frame transition range that indicated the video was paused, based on the predefined frame reference function. For example, the secondary device may determine that a new, distinct frame appears after the frame did not change for a while. Based on determining that the captured frame corresponds to a different frame transition range, the secondary device may resume playback of the secondary audiovisual content based on the different frame transition range.

Once synchronization is updated, if necessary, processing returns to step 630 and playback of the secondary content continues with continuous/periodic returns to step 640 to check a currently displayed video frame for updates. Once playback ends, method 600 is complete.

The frame transition detection and synchronization may be thought of (and implemented using) a state machine, according to some aspects. As mentioned above, the system may predetermine the earliest and latest frames, within an interval, for which the image recognition software (frame reference function, e.g. ARKit's frame identification functionality that identifies a reference frame in captured image data) will recognize them as identical. Then within the AR application a state machine may be employed which contains the following states and transitions (according to an implementation): no image being detected, entering image detection, image continually being detected, and leaving image detection. The states are simplest to explain in that they are simply used to maintain themselves and check whether or not a transition has occurred. Transitions are used roughly the same among different states: they are used to collect a distribution of real-time data which encapsulates how far away the AR application's internal "event time" is from the actual elapsed time in the video.

Upon a state transition, if the event time falls within the lower or upper bound associated with the most recent detected frame, then the AR application may be assumed to be relatively in sync and the AR application continues to run as normal. However, if the event time is detected to fall outside of this interval then the system may calculate the least squares line using the collected distribution of errors (as well as appending the next idealized timestamp to this distribution). The coefficients of this equation are then used to recalibrate the tick rate of the AR application's timer, and to offset the current event time. This technique has the potential added benefit of being able to dynamically align itself with the frames per second of the media depending on the platform it is being hosted on. For example, YouTube often re-encodes videos to be played back at 30 fps. But if the frames per second of the streaming video is known in advance, this may be further utilized in initializing the algorithm and may help minimize any initial desynchronization which can occur.

Having described aspects of the invention in detail, below is exemplary pseudo code with explanatory comments detailing an algorithm for an implementation of some aspects described herein.

```
// Check if a pixel buffer "looks enough like" a known frame,
// returning the frame's id if a match is found, else NULL
function RecognizeFrame(frame) →String?
// Maps each frame id to the smallest and largest frame number
// which it has been observed to occur at—fixed ahead of time
frame_bounds: Map<String, Array<Int>>
// Global variables
internal_time: Float=0
event_tickrate: Float=1/60
event_time: Int=0
wf_count: Int=0
witnessed_frames: Array<String>=H
witness_index: Int=0
witnessed_timestamps: Array<Int>=H
is_witnessing: Boolean=false
current_id: String
dist_index: Int=0
error_distribution: Array<Int>=H
// Called by our timer 60 times per second
function TimerCallback( )
{
    internal_time+=1/60
    if internal_time>=event_tickrate
    {
        event_time+=1
        internal_time=0
        // Executes event with id 'i' if event_time==i
        ExecuteEvent(event_time)
    }
```

```
}
// Called once for each frame received by the camera.
    Collect an array of all
// timestamps wherein a particular frame has been
    observed—consuming them
// once a state transition has occurred, i.e.
// (Frame A witnessed →Frame B witnessed)
// (Frame A witnessed →No frame witnessed)
function WitnessedFrameTimestamp(frame)
{
   recognized_id=RecognizeFrame(frame)
   if recognized_id!=NULL
   {
      // If at least two sequences of frames have been
         observed
      // assume that media playback has occurred and start
         the
      // timer used for triggering events
      if wf_count<1 and recognized_id not in witnessed-
         _frames
      {
         if wf_count==1
         {
            // Create a timer which calls the function
            // 'TimerCallback' 60 times per second
            CreateTimer(TimerCallback, 60)
            // Forcefully set the initial event time to the lower
               bound
            // of the current frame being witnessed
            event_time=frame_bounds [recognized_id] [0]
         }
         witnessed_frames [wf_count]=recognized_id
         wf_count+=1
      }
      if witness_index>0
      {
         ConsumeWitnessedTimestamps(current_id, witness-
            _index, witnessed_timestamps)
         witness_index=0
         witnessed_timestamps=H
      }
      is_witnessing=true
      current_id=recognized_id
      witnessed_timestamps[witness_index]=event_time
      witness_index+=1
   }
   else
   {
      is_witnessing=false
      if witness_index>0
      {
         ConsumeWitnessedTimestamps(current_id,
            num_witnessed, witnessed_timestamps)
         witness_index=0
         witnessed_timestamps=H
      }
   }
}
// Update error distribution and update tick rate if applicable
function   ConsumeWitnessedTimestamps(id,   num_wit-
    nessed, timestamps)
{
   lower_bound=frame_bounds[id][0]
   upper_bound=frame_bounds [id] [1]
   first=timestamps[0]
   last=timestamps[num_witnessed—1]
   lower difference=lower_bound— first
   upper_difference=last—upper_bound
   if upper_difference>0
   {
      event_time -=upper_difference
      error_distribution[dist_index]=[last, upper_bound]
      dist_index+=1
      UpdateTickrate(error_distribution, id)
   }
   else if lower difference>0
   {
      event_time+=lower difference
      error_distribution[dist_index]=[lower_bound, first]
      dist_index+=1
      UpdateTickrate(error_distribution, id)
   }
}
function UpdateTickrate(distribution)
{
   X, Y, Xs, XY=0
   N=1
   for [x, y] in distribution
   {
      X+=x
      Y+=y
      Xs+=x*x
      XY+=x*y
      N+=1
   }
   // Get the lower bound for the frame id proceeding 'id'
   next_lower=NextFrameBounds(id)
   X+=next_lower
   Y+=next_lower
   Xs+=next_lower*next_lower
   XY+=next_lower*next_lower
   denominator=(N*Xs-X*X)
   if denominator !=0
   {
      a=(N*XY-X*Y)/denominator
      b=(Y-a*X)/N
      event_tickrate=a/60
      event_time-=Floor(b)
   }
}
```

Aspects described herein are not limited only to video content. Many of the same issues with video content and downsampling/compression are present in audio content as well. Some implementations may synchronize secondary audiovisual content with captured audio based on predetermined transition portions of audio. And audio feedback can be used in conjunction with the video capture to provide a further enhanced synchronized experience for the user. And aspects described herein are not limited to music videos, any suitable video, audiovisual content, or other suitable content that can be divided into logical frames may be processed and analyzed according to the techniques described above to determine synchronization timings for an AR application or other secondary audiovisual content. Further, the secondary audiovisual content need not include both audio and visual elements. As used herein, the secondary audiovisual content may include audio content, video content, and/or combinations thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
determining a set of frame transition ranges for an audio track, wherein each respective frame transition range comprises a starting frame identifier and an ending frame identifier associated with a series of audio frames of the audio track that are each determined to be substantially identical by a predefined frame reference function;
capturing, by a secondary device and at a first time, a currently playing first portion of the audio track during playback of the audio track by a primary device;
generating, as a first audio frame corresponding to a current playback position, a spectrogram based on the captured first portion of the audio track;
determining, by the secondary device and based on the predefined frame reference function, a first frame transition range corresponding to the first audio frame;
synchronizing, by the secondary device, secondary audiovisual content with the playback of the audiovisual content based on the first frame transition range corresponding to the first audio frame;
capturing, by the secondary device and at a second time after the first time, a currently playing second portion of the audio track during the playback of the audio track by the primary device;
generating, as a second audio frame corresponding to the current playback position, a spectrogram based on the captured second portion of the audio track;
determining, by the secondary device, whether the second audio frame corresponds to a current audio frame transition range corresponding to the current playback position of the secondary audiovisual content based on the predefined frame reference function; and
synchronizing, by the secondary device and based on determining that the second audio frame does not correspond to the current frame transition range, the secondary audiovisual content with the playback of the audiovisual content based on a second frame transition range identified as corresponding to the second audio frame based on the predefined frame reference function.

2. The method of claim 1, further comprising:
generating a spectrogram corresponding to the audio track; and
splitting the spectrogram corresponding to the audio track into a plurality of audio frames, each audio frame of the plurality of audio frames corresponding to a respective portion of the audio track,
wherein determining the set of frame transition ranges for the audio track is based on the plurality of audio frames.

3. The method of claim 2, wherein the predefined frame reference function is provided by a toolkit and is configured to compare a portion of a captured audio frame to a reference audio frame, and
wherein the set of frame transition ranges are predetermined based on processing audio frames of the plurality of audio frames to determine a series of contiguous frames that are deemed substantially identical by the predefined frame reference function.

4. The method of claim 3, wherein:
the starting frame identifier of a given frame transition range corresponds to the first audio frame of the series of contiguous frames that differs from the frames of a prior transition range based on the predetermined frame reference function, and
the ending frame identifier of the given frame transition range corresponds to the last audio frame of the series of contiguous frames prior to a different frame of a next transition range based on the predetermined frame reference function.

5. The method of claim 1, wherein each audio frame in a given frame transition range is determined to be substantially identical to each other audio frame in the frame transition range based on the predefined frame reference function determining that the audio frames are identical.

6. The method of claim 1, further comprising:
capturing, by the secondary device and at a third time between the first time and the second time, a third audio frame, corresponding to a third playback position during the playback of the audio track by the primary device;
determining, by the secondary device, whether the captured third audio frame corresponds to the current frame transition range based on the predefined frame reference function; and
based on determining that the captured third audio frame does correspond to the current frame transition range, continuing playback of the secondary audiovisual content synchronized based on the first frame transition range corresponding to the captured first audio frame of the audio track.

7. The method of claim 1, wherein synchronizing the secondary audiovisual content with the playback of the audio track based on the first transition range comprises:
synchronizing the secondary audiovisual content with the playback of the audio track based on the starting frame identifier of the first frame transition range.

8. The method of claim 1, wherein synchronizing the secondary audiovisual content with the playback of the audio track based on the first transition range comprises:
selecting a frame identifier between the starting frame identifier of the first frame transition range and the ending frame identifier of the first frame transition range based on selection criteria; and
synchronizing the secondary audiovisual content with the playback of the audio track based on the selected frame identifier.

9. The method of claim 1, wherein the secondary audiovisual content comprises an augmented reality application corresponding to the audio track.

10. The method of claim 1, wherein synchronizing the secondary audiovisual content comprises causing events in the augmented reality application to be displayed on the secondary device corresponding to a playback position during the playback of the audio track on the primary device.

11. The method of claim 1, wherein the audio track is an audio component associated with a video presentation.

12. The method of claim 1, wherein the audio track is played as part of display of a video presentation.

13. The method of claim 12, wherein the video presentation comprises a streaming video.

14. A computer-implemented method comprising:
determining a set of frame transitions for an audio track, wherein each frame transition corresponds to a respective starting audio frame a starting frame identifier that is determined to be different from a prior audio frame based on the predefined frame reference function;

capturing, by a secondary device and at a first time, a currently playing first portion of the audio track during playback of the audio track by a primary device;

generating, as a first audio frame corresponding to a current playback position, a spectrogram based on the captured first portion of the audio track;

determining, by the secondary audio device, a first playback position of the audio track based on a first frame transition, of the set of frame transitions, corresponding to the first audio frame;

synchronizing, by the secondary device, secondary audiovisual content with the playback of the audiovisual content based on the first frame transition corresponding to the first audio frame;

capturing, by the secondary device and at a second time after the first time, a currently playing second portion of the audio track during the playback of the audio track by the primary device;

generating, as a second audio frame corresponding to the current playback position, a spectrogram based on the captured second portion of the audio track;

determining, by the secondary device, a second frame transition, of the set of frame transitions, corresponding to the second audio frame when the predefined frame reference function indicates that the second audio frame is different from the first audio frame; and synchronizing, by the secondary device and based on determining the second frame transition, the secondary audiovisual content with the playback of the audio track based on the starting audio frame of the second frame transition identified as corresponding to the second audio frame.

15. The method of claim 14, further comprising:

generating a spectrogram corresponding to the audio track; and splitting the spectrogram corresponding to the audio track into a plurality of audio frames, each audio frame of the plurality of audio frames corresponding to a respective portion of the audio track, wherein determining the set of frame transitions for the audio track is based on the plurality of audio frames.

16. The method of claim 14, wherein synchronizing the secondary audiovisual content comprises causing events in the augmented reality application to be displayed on the secondary device corresponding to a playback position during the playback of the audio track on the primary device.

17. A computing device comprising:

one or more processors; and memory storing instructions that, when executed by the one or more processors, cause the computing device to:

determine a set of frame transition ranges for an audio track, wherein each respective frame transition range comprises a starting frame identifier and an ending frame identifier associated with a series of audio frames of the audio track that are each determined to be substantially identical by a predefined frame reference function;

capture, at a first time, a currently playing first portion of the audio track during playback of the audio track by a primary device;

generate, as a first audio frame corresponding to a current playback position, a spectrogram based on the captured first portion of the audio track;

determine, based on the predefined frame reference function, a first frame transition range corresponding to the first audio frame;

synchronize secondary audiovisual content with the playback of the audiovisual content based on the first frame transition range corresponding to the first audio frame;

capture, at a second time after the first time, a currently playing second portion of the audio track during the playback of the audio track by the primary device;

generate, as a second audio frame corresponding to the current playback position, a spectrogram based on the captured second portion of the audio track;

determine whether the second audio frame corresponds to a current audio frame transition range corresponding to the current playback position of the secondary audiovisual content based on the predefined frame reference function; and synchronize, based on determining that the second audio frame does not correspond to the current frame transition range, the secondary audiovisual content with the playback of the audiovisual content based on a second frame transition range identified as corresponding to the second audio frame based on the predefined frame reference function.

18. The computing device of claim 17, wherein the memory stores instructions that further cause the computing device to:

generate a spectrogram corresponding to the audio track; and split the spectrogram corresponding to the audio track into a plurality of audio frames, each audio frame of the plurality of audio frames corresponding to a respective portion of the audio track, wherein determining the set of frame transition ranges for the audio track is based on the plurality of audio frames.

19. A non-transitory computer-readable medium storing instructions that, when executed by one or more processors, cause a computing device to perform steps comprising:

determining a set of frame transition ranges for an audio track, wherein each respective frame transition range comprises a starting frame identifier and an ending frame identifier associated with a series of audio frames of the audio track that are each determined to be substantially identical by a predefined frame reference function;

capturing, by a secondary device and at a first time, a currently playing first portion of the audio track during playback of the audio track by a primary device;

generating, as a first audio frame corresponding to a current playback position, a spectrogram based on the captured first portion of the audio track;

determining, by the secondary device and based on the predefined frame reference function, a first frame transition range corresponding to the first audio frame;

synchronizing, by the secondary device, secondary audiovisual content with the playback of the audiovisual content based on the first frame transition range corresponding to the first audio frame;

capturing, by the secondary device and at a second time after the first time, a currently playing second portion of the audio track during the playback of the audio track by the primary device;

generating, as a second audio frame corresponding to the current playback position, a spectrogram based on the captured second portion of the audio track;

determining, by the secondary device, whether the second audio frame corresponds to a current audio frame transition range corresponding to the current playback position of the secondary audiovisual content based on the predefined frame reference function; and synchronizing, by the secondary device and based on determining that the second audio frame does not correspond to the current frame transition range, the secondary audiovisual content with the playback of the audiovisual content based on a second frame transition range identified as corresponding to the second audio frame based on the predefined frame reference function.

20. The computer-readable medium of claim 19, wherein the instructions cause the computing device to perform further steps comprising:

generating a spectrogram corresponding to the audio track; and splitting the spectrogram corresponding to the audio track into a plurality of audio frames, each audio frame of the plurality of audio frames corresponding to a respective portion of the audio track, wherein determining the set of frame transition ranges for the audio track is based on the plurality of audio frames.

* * * * *